United States Patent Office 3,563,941
Patented Feb. 16, 1971

3,563,941
SILICONE MODIFIED CARNAUBA WAX
Edwin P. Plueddemann, Midland, Mich., assignor to Dow Corning Corporation, Midland, Mich., a corporation of Delaware
No Drawing. Continuation of application Ser. No. 443,658, Mar. 29, 1965. This application Nov. 14, 1969, Ser. No. 871,526
Int. Cl. C07f 7/18; C08h 9/06; C08k 1/64
U.S. Cl. 260—28
19 Claims

ABSTRACT OF THE DISCLOSURE

A silicone-carnauba wax copolymer is disclosed. The silicone-carnauba wax is a copolymer of an organosilicon compound and carnauba wax bonded together by predominantly ether linkages. The silicone-carnauba wax copolymers are waxes useful as lipsticks, floor wax, furniture wax and the like.

This application is a continuation of my application Ser. No. 443,658, filed Mar. 29, 1965, now abandoned.

The present invention relates to a copolymer of carnauba wax and a silicon-containing compound.

Carnauba wax is a hard, high temperature melting wax. These characteristics are not suitable for many uses and to make the wax usable additives are belnded with the carnauba wax to give the desired properties.

An object of this invention is to provide a copolymer of silicon-containing compounds and carnauba wax. Another object is to provide a silicone modified carnauba wax copolymer which is compatible with siloxane fluids. Another object is to provide a silicone modified carnauba wax copolymer which has film forming properties. Another object is to provide a silicone modified carnauba wax copolymer which is suitable for use in cosmetic compositions such as in lip coloring compositions. These and other objects will be apparent by the following description of this invention.

This invention relates to a silicone-carnauba wax copolymer consisting essentially of a silicon-containing moiety bonded to a carnauba wax moiety through an organic radical attached to a silicon atom through a silicon-carbon bond and said organic radical linking the silicon-containing moiety and carnauba wax moiety predominantly by ether linkages.

Carnauba wax is a product found in nature and is scientifically identified as *Corypha cerifera*. Carnauba wax is primarily obtained in three forms, commonly known as yellow, crude and refined. Carnauba wax is essentially a mixture of high molecular weight esters of two types, one type being esters of n-alkanoic acids having from 18 to 30 carbon atoms and n-aliphatic alcohols having from 24 to 34 carbon atoms and the other type being esters of omega-hydroxy-n-alkanoic acids having from 18 to 30 carbon atoms and n-aliphatic alcohols. Carnauba wax also contains free acids and alcohols, hydrocarbons, resins and esters of aliphatic diols. The above analysis of carnauba wax is intended to provide a better understanding of the present invention and should not be construed as limiting the invention as otherwise described herein. Any carnauba wax is operable in the present invention such as carnauba wax which is partially or completely hydrolyzed and carnauba wax which is found in nature. Carnauba wax has a solidifying point of 86° to 90° C.

Carnauba wax contains a large amount of unreacted hydroxyl radicals. These hydroxyl radicals react with epoxy groups which are attached to a silicon atom of the silicon-containing compounds to form the silicone-carnauba wax copolymer. The linkages formed by this reaction are ether linkages.

The linkages which bond the silicon-containing moiety and the carnauba wax moiety are predominantly ether linkages. By the term predominantly it is meant that a majority (i.e. at least 60%) of the linkages are ether linkages. Any of the remaining linkages are ester linkages. The word predominantly is used because different carnauba waxes have varying amounts of unreacted carboxylic acid groups and different methods of preparing the copolymers of this invention produce varying amounts of ester linkages. In some cases the preparation produces almost exclusively ether linkages. When a hydrolyzed carnauba wax is used, the amount of free acid increases and thus the amount of possible ester linkages increases under favorable conditions. It is preferred that less than 10 percent of the linkages are ester linkages because ester linkages can be more readily hydrolyzed than ether linkages.

The silicone-carnauba wax copolymers are best prepared by mixing molten carnauba wax with an epoxy silicon compound in the presence of suitable catalyst. Suitable catalyst for the reaction are for example, tertiary amines, quaternary ammonium hydroxides, alkali hydroxides and Lewis acids such as boron trifluoride, tin tetrachloride and aluminum trichloride. The preferred catalysts are the Lewis acids because these catalysts give a more specific epoxy-hydroxyl reaction and thus produce fewer ester linkages. The reaction can also be carried out in a suitable organic solvent in order to use milder reaction temperatures. Suitable organic solvents include any neutral solvent free of active hydrogens such as esters, ethers, ketones, hydrocarbons, tertiary amines and amides. Examples of suitable organic solvents are benzene, ethylene glycoldimethylether, dioxane, toluene, hexane, butylacetate, methylbutyl ketone and chlorobenzene. Organic solvents such as primary and secondary amines, alcohols, phenols and carboxylic acids should not be used.

The amount of epoxy silicone compound used should be such that there is not more than 1.5 epoxy groups in the epoxy silicon-containing compound per 1.0 hydroxyl radicals in the carnauba wax. Preferably, there is one epoxy group per one hydroxyl group. The amount of silicon-containing moieties present can be from 5 to 70 weight percent based on the combined weight of the silicon-containing moieties and the carnauba wax moieties. Preferably the amount of silicon-containing moieties present is in the range from 15 to 40 weight percent.

The epoxy silicon containing compounds operable in this invention which can be reacted with the carnauba wax are those which contain an epoxy bearing organic radical bonded to a silicon atom through a silicon-carbon bond. The epoxy group is a well known organic radical of the formula

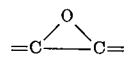

The organic radicals containing epoxy groups preferably are composed of carbon, hydrogen and oxygen. Specific examples of silicon bonded epoxy containing organic radicals are

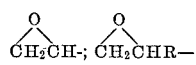

in which R is any divalent organic radical such as hydrocarbon radicals such as methylene, ethylene, butylene, hexylene, octadecylene, phenylene, xenylene, tolylene, xylylene and

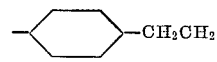

any hydroxylated hydrocarbon radical; any halohydrocarbon radical such as chloroethylene, fluoroethylene, bromophenylene, chloropentylene, and bromoxenylene and any divalent ether radical of the type $(R'OR')_x$ where each $R'$ can be any of the group listed under R and $x$ is an integer of at least 1. Specific examples of such divalent ether groups are

—CH$_2$CH$_2$OCH$_2$CH$_2$—

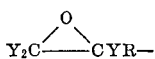

—CH$_2$(OCH$_2$CH$_2$)$_6$OCH$_2$CH$_2$CH$_2$—

—CH$_2$OCH$_2$CH$_2$OCH$_2$CH$_2$—

—CH$_2$OCH$_2$CH=CH— and

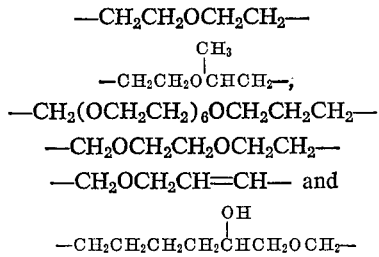

Other examples of silicon bonded epoxy bearing organic radicals are those of the formula

in which R is defined above and Y can be a hydrogen atom or any organic radical such as monovalent hydrocarbon radicals, such as methyl, ethyl, propyl, butyl, hexyl, octadecyl, phenyl, tolyl, xylyl, xenyl and cyclohexyl radicals; halogenated monovalent hydrocarbon radicals such as chloromethyl, trifluoropropyl, chlorophenyl, bromohexyl, pentafluorobutyl, bromoxenyl and $\alpha,\alpha,\alpha$-trifluorotolyl radicals and hydroxylated hydrocarbon radicals such as hydroxypropyl, 3-hydroxybutyl and hydroxyhexyl radicals.

The epoxy silicon containing compounds of this invention can be silanes or siloxanes, therefore the silicon-containing compound consists essentially of at least one silicon atom to which is bonded at least one epoxy bearing organic radical. The silanes can be of the formula $A_nSiX_{4-n}$ in which A is an epoxy containing organic radical bonded to the silicon atom through a silicon-carbon bond, X is a hydroxyl radical or a hydroxycarbonoxy radical of the formula —OR'' in which R'' is a monovalent hydrocarbon or halohydrocarbon radical such as methyl, ethyl, propyl, butyl, dodecyl, phenyl, fluorobutyl, $\alpha,\alpha,\alpha$-trifluorotolyl, chloropropyl, chlorophenyl and hydrocarbon ether radicals such as —CH$_2$CH$_2$OCH$_2$CH$_3$, —CH$_2$CH$_2$CH$_2$OCH$_3$, —(CH$_2$)$_4$—O—CH$_2$CH$_3$ —(CH$_2$)$_3$O—C$_6$H$_5$, —CH$_2$CH$_2$OCH$_3$ radicals, and $n$ has a value from 1 to 4 inclusive. Other silanes of the formula $A_nR'''_mSiX_{4-m-n}$ in which R''' is a hydrogen atom, a monovalent hydrocarbon radical or a monovalent halogenated hydrocarbon radical as illustrated for R'', $m$ has a value from 1 to 3, $n$ has a value from 1 to 3 and A and X are defined above. The siloxanes can be of the formula

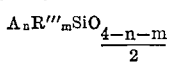

in which A and R''' are defined above, $n$ has a value from 1 to 3 and $m$ has a value from 0 to 2 and $n+m$ is less than 4. These siloxanes can be prepared by hydrolyzing and condensing the corresponding silanes where X is a hydrolyzable group or a condensable group.

The siloxanes can be homopolymers in which each silicon atom contains at least one epoxy bearing organic radical or they can be copolymers in which each silicon atom contains at least one epoxy bearing organic radical. The siloxanes can also be copolymers in which only some of the silicon atoms contain at least one epoxy bearing organic radical and the remaining silicon atoms are substituted with monovalent radicals such as hydrocarbon radicals, halohydrocarbon radicals, hydroxyl radicals, hydrocarbonoxy radicals, halohydrocarbonoxy radicals, hydrogen atoms and divalent oxygen atoms which are bonded to another silicon atom. These copolymers can have from 0.001 mol percent to 99.999 mol percent siloxane units having at least one epoxy bearing organic radical.

The copolymer having at least 0.1 mol percent siloxane units having at least one epoxy bearing organic radical are preferred.

The following are specific examples of epoxy containing organosilicon compounds:

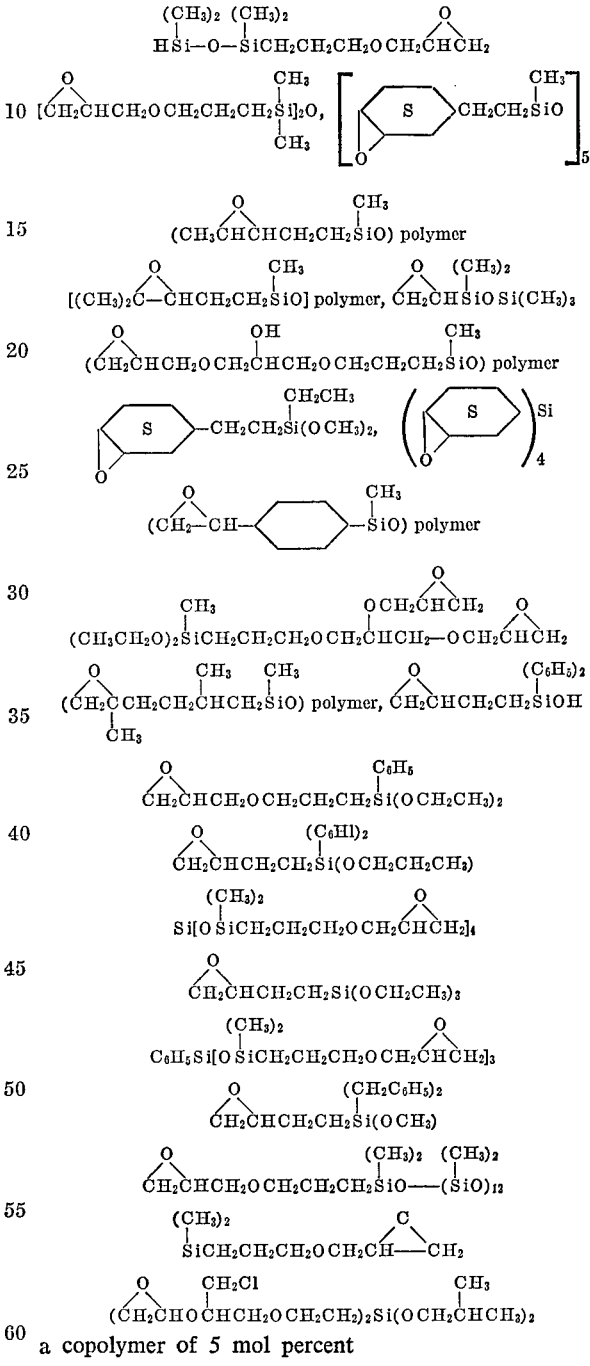

a copolymer of 5 mol percent

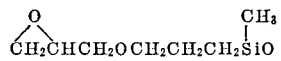

units and the remainder (CH$_3$)$_2$SiO units and (CH$_3$)$_3$SiO$_{0.5}$ units,

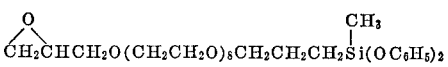

a copolymer of 30 mol percent (C$_6$H$_5$)(CH$_3$)SiO units, 20 mol percent

units and 50 mol percent

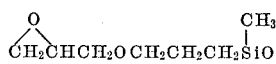

units,

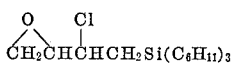

a copolymer of 50 mol percent (C$_6$H$_5$)(CH$_3$)SiO units and 50 mol percent

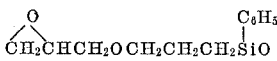

units,

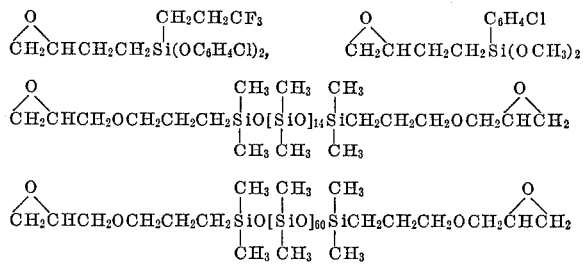

a copolymer of 40 mol percent

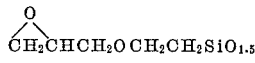

and 60 mol percent C$_6$H$_5$SiO$_{1.5}$ and

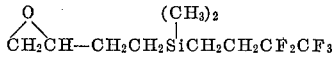

The above silanes and siloxanes as well as others described herein can be prepared as described in Canadian Pat. No. 580,908, issued Aug. 4, 1959.

The most preferred epoxy containing silicon compounds are those of the formulae

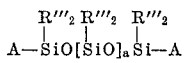

where A and R''' are defined above and $a$ has an average value from 0 to 100, and A$_n$SiX$_{4-n}$ where A and X are defined above and $n$ has a value from 1 to 3.

The silicon-containing moiety consists essentially of at least one silicon atom to which is bonded through a silicon-carbon bond at least one divalent organic radical consisting essentially of carbon atoms, hydrogen atoms and oxygen atoms. The organic radical is also bonded to a carnauba wax moiety predominantly through an ether linkage. Any remaining valences of the silicon atom are satisfied by radicals such as monovalent hydrocarbon radicals, such as methyl, ethyl, propyl, butyl, hexyl, cyclohexyl, cyclopentyl, phenyl, tolyl, xenyl, naphthyl, octadecyl, tertiary butyl and ethylphenyl and beta-phenyl-ethyl radicals; monovalent halogenated hydrocarbon radicals, such as chloromethyl, chloropropyl, trifluoropropyl, pentafluoropentyl, chlorophenyl, bromobutyl, fluoroethyl, bromophenyl and chloropentyl radicals; monovalent hydrocarbonoxy radicals such as methoxy, ethoxy, propoxy, butoxy, phenoxy, hexoxy, beta-methoxyethoxy, beta-ethoxyethoxy, gamma, methoxypropoxy and beta-phenoxyethoxy radicals; monovalent halogenated hydrocarbonoxy radicals, such as chloroethoxy, trifluoropropoxy, bromobutoxy, chlorophenoxy and pentafluoroheptoxy radicals; hydroxyl radicals; hydrogen atoms; and divalent oxygen atoms. The divalent oxygen atoms are bonded to another silicon atom forming a silicon-oxygen-silicon bond. The other silicon atom has its valences satisfied by any of the radicals described above.

The silicone-carnaube wax copolymers consist essentially of a silicon-containing moiety bonded to a carnauba wax moiety predominantly by ether linkages such as (silicone) —CY$_k$—O—CH$_2$— (carnauba wax) linkage. Since carnauba wax does contain some free acid groups (—COOH), the silicone-carnauba wax copolymer can also contain some ester linkages such as (silicone)

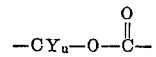

(carnauba wax) linkages.

The silicon-containing moiety, (silicone)—CY$_k$—, can be of a formula such as

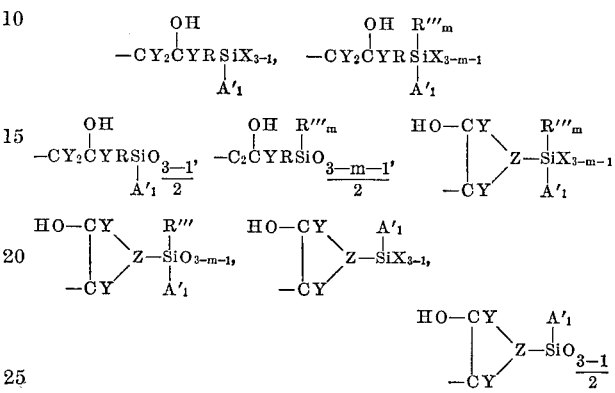

mixtures thereof, copolymers thereof, and copolymers consisting essentially of from 0.001 to 99.999 mol percent units of a formula selected from the group consisting of

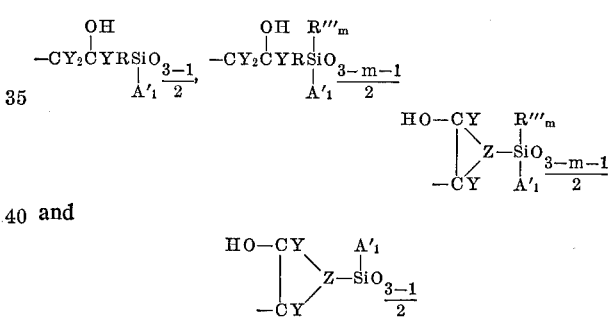

and

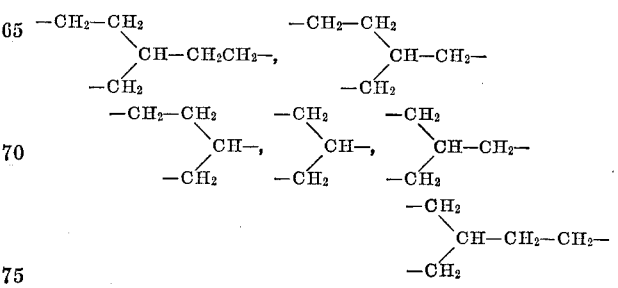

and 0.001 to 99.999 mol percent units of the formula selected from the group consisting of SiO$_{4/2}$, R'''SiO$_{1.5}$, R'''$_2$SiO, and R'''$_3$SiO$_{0.5}$. In the silicon-containing moiety, $k$ is an integer from 1 to 2 inclusive. When $k$ is 1, the —CY$_k$— group is bonded to two carbon atoms exclusive of carbon atoms in the Y radicals such as

and when $k$ is 2, the —CY$_k$— group is bonded to only one other carbon atom exclusive of the carbon atoms of the Y radicals. The Y, X, and R''' radicals are monovalent radicals as previosuly defined herein. The R and R' radicals are divalent radicals as previously defined herein. The Z radical is a trivalent radical such as hydrocarbon radical such as,

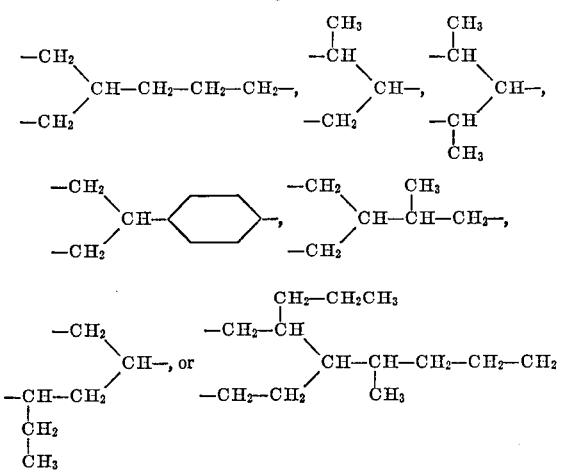

radicals; hydroxylated hydrocarbon radicals such as

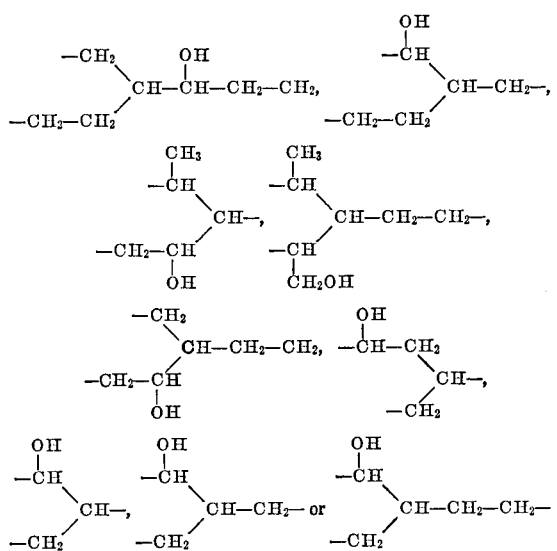

radicals; halogenated hydrocarbon radicals such as,

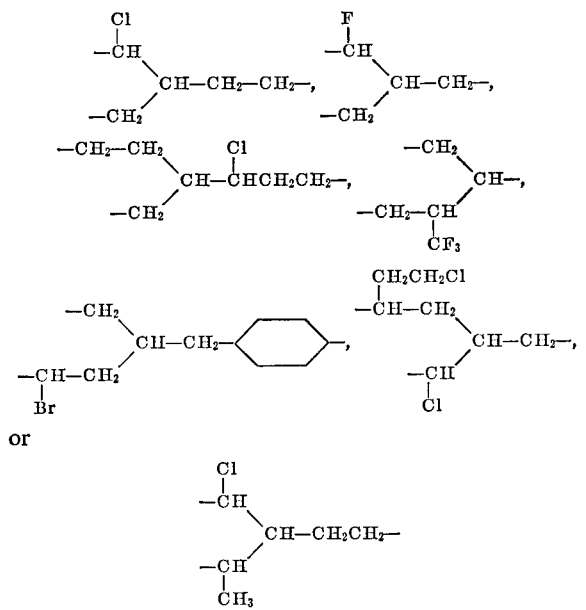

radicals; and ZOR' radicals wherein Z and R' are defined above. The A' radical is a divalent radical bonded to the carnauba wax moiety through an oxygen atom which is bonded to a carbon atom of the A' radical having attached thereto a Y radical. A' can be a

radicals or

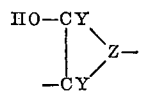

radicals. In the silicon-containing moiety, $l$ can be 0, 1, 2 or 3 and $m$ can be 0, 1, 2 or 3.

One of the preferred silicone-carnauba wax copolymers consists essentially of a silicon-containing moiety of the formula

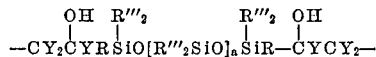

in which Y, R and R''' are previously defined herein and $a$ has an average value from 0 to 100 inclusive. The silicon-containing moiety is bonded to a carnauba wax moiety predominantly through ether linkages. Preferably, Y is a hydrogen atom, R''' is a methyl radical and $a$ has an average value from 0 to 50 inclusive. Preferred silicone-carnauba wax copolymer species consist essentially of a carnauba wax moiety and a silicon-containing moiety of the formula

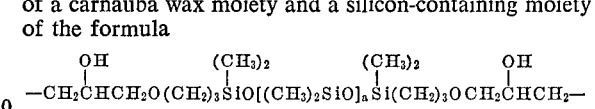

in which $a$ has an average value from 0 to 30.

Another preferred silicone-carnauba wax copolymer consists essentially of a carnauba wax moiety bonded to a silicon-containing moiety predominantly through ether linkages. The silicon-containing moiety is

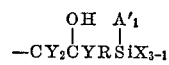

in which Y, R, X and $l$ are previously defined herein and A' is a divalent radical of the formula

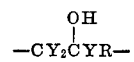

which is bonded to the carnauba wax moiety through an oxygen atom in turn attached to the carbon atom which is attached a Y radical. Preferably, Y is a hydrogen atom, X is an alkoxy and R is a —(R'OR')$_x$— and $l$ is 0.

Another preferred silicone-carnauba wax copolymer consists essentially of a carnauba wax moiety bonded a silicon-containing moiety predominantly through ether linkages. The silicon-containing moiety is of the formula

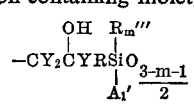

in which Y, R and R''' are defined above, A' is a divalent radical of the formula

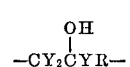

which is bonded to the carnauba wax moiety through an oxygen atom in turn attached to the carbon atom which is attached to a Y radical, $l$ is 0, 1 or 2 and $m$ is 0, 1 or 2. Preferably, Y is a hydrogen atom, R''' is a methyl radical, $m$ is 1 and $n$ is 0.

The silicone-carnauba wax copolymers are good film forming materials. Whereas carnauba wax alone will not lay down a film of wax, the silicone-carnauba wax copolymer will form a good, tough film. The silicone-carnauba wax copolymer essentially retains the high melting point of the unmodified carnauba wax, but it is also workable such as will spread easily on a surface and is not as brittle as the unmodified carnauba wax. The silicone-carnauba wax copolymer is also compatible with diorgano-siloxane fluids, such as phenylmethylpolysiloxane fluids and dimethylpolysiloxane fluids whereas the unmodified carnauba wax is incompatible with these fluids.

The silicone-carnauba wax copolymers are waxes and can be used in cosmetic compositions such as lipsticks, in leather balm, shoe polish, automobile polish, floor wax and furniture waxes and polishes and in release agents.

The following examples are illustrative only and should not be construed as limiting the invention which is properly delineated in the appended claims.

EXAMPLE 1

A silicone-carnauba wax copolymer was prepared by melting 100 g. of carnauba wax which provided 0.1 equivalent of hydroxyl radicals. To the molten wax, 20 drops of $BF_3 \cdot CH_3CH_2OCH_2CH_3$ and 20 g. of

which provided 0.1 equivalent of epoxy groups was added. The mixture was stirred for 30 minutes while the temperature was maintained at 80° to 100° C. The product was poured in a Pyrex dish to cool. A tough wax was obtained having a melting point of 82° C. No reactive epoxy groups could be detected.

EXAMPLE 2

A solution was prepared by mixing 50 g. of carnauba wax, 50 g. of benzene and 15 drops of $$BF_3 \cdot CH_3CH_2OCH_2CH_3$$

The solution was heeated to 80° C. and then 15.0 g. of

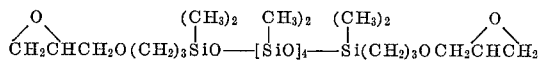

was added. The resulting mixture was warmed to reflux and maintaineed at reflux for 30 minutes. The benzene was removed by stripping up to 100° C. at 1 mm. Hg. The residue cooled to a smooth hard wax which melted at 80° to 85° C. No unreacted epoxy groups could be detected. A benzene solution of the above silicone-carnauba wax copolymer was deposited on a surface. Upon the evaporation of the benzene a smooth continuous waxy film was deposited on the surface. An equivalent benzene solution of carnauba wax deposited powder upon the evaporation of the benzene.

EXAMPLE 3

A solution of 50 g. of carnauba wax in 50 g. of ethylene glycol dimethylether was warmed to 80° C. and then 10 drops of $BF_3 \cdot CH_3CH_2OCH_2CH_3$ was added. A warm solution of 40 g. of

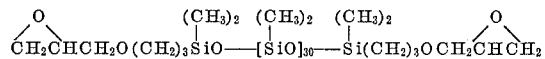

in 40 g. of ethylene glycoldimethylether was added with stirring. The mixture was warmed for 10 minutes at 80° C. and then stripped to 160° C. at 1 mm. Hg to remove the solvent. The clear liquid residue solidified to a smooth soft wax that softened at 70° C. and melted at 80° to 85° C. No unreacted epoxy groups were detected.

EXAMPLE 4

A solution was prepared by mixing 50 g. of carnauba wax, 50 g. of ethyleneglycoldimethylether and 30 drops of $BF_3 \cdot CH_3CH_2OCH_2CH_3$. The solution was warmed to 80° C. at which point 12.5 g. of

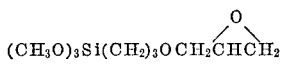

was added. The mixture was refluxed for 30 minutes and then stripped to 100° C. at 1 mm. Hg. The clear oily residue solidified at room temperature to a smooth wax having a melting point at 80° to 85° C. Analysis indicated that no residual epoxy groups remained.

A 10 weight percent ethyleneglycoldimethylether solution of the above product with 0.1 weight percent $SnCl_4$ was used to deposit a film on a glass surface and an aluminum surface. After 30 minutes at 150° C., a clear, non-tacky solid film which was infusible and insoluble was obtained.

EXAMPLE 5

To a solution of 31 g. of the silicone-carnauba wax copolymer of Example 4 in 25 g. of ethyleneglycoldimethylether was added 40 g. of an essentially hydroxyl endblocked dimethylpolysiloxane fluid having 3.9 weight percent hydroxyl radicals and 1.0 g. of sodium acetate. The mixture was warmed slowly to distill off the methanol and ethyleneglycoldimethylether and then was stripped to 120° C. at 20 mm. Hg. A soft, creamy wax was obtained.

EXAMPLE 6

A mixture of 436 g. of the dimethylpolysiloxane of Example 5, 250 g. of

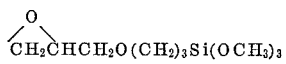

and 2 g. of sodium acetate was warmed to 120° C. while distilling off the methanol. The mixture was finally stripped to 120° C. at 20 mm. Hg. The residue was filtered and a clear liquid was obtained which had an epoxy group content of 0.14 epoxy equivalent per 100 g. of product. The siloxane was essentially

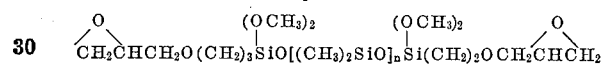

To a warm solution of 20 g. of carnauba wax, 20 g. of ethyleneglycoldimethylether and 10 drops of $$BF_3 \cdot CH_3CH_2OCH_2CH_3$$

was added 15 g. of the above siloxane. The reaction product was stripped to 120° C. at 20 mm. Hg. A smooth wax melting at 82° to 90° C. was obtained.

EXAMPLE 7

A hard, tough wax melting at 83° to 90° C. was obtained when 20 g. of carnauba wax, 20 g. of ethyleneglycoldimethylether, 10 drops of $BF_3 \cdot CH_3CH_2OCH_2CH_3$ and 3.3 g. of

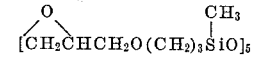

were reacted according to the procedure of Example 3. The residue was stripped to 120° C. at 20 mm. Hg. Analysis indicated that no unreacted epoxy groups remained.

EXAMPLE 8

Following the procedure of Example 3 using 10 g. of carnauba wax, 10 g. of ethyleneglycoldimethylether, 5 drops of $BF_3 \cdot CH_3CH_2OCH_2CH_3$ and 2.8 g.

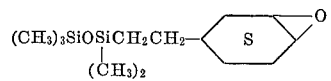

a soft wax was obtained which softened at 70° C. and melted at 80° to 84° C.

EXAMPLE 9

A mixture of 100 g. of carnauba wax, 200 g. of isopropanol, 100 g. of toluene and 100 g. of a solution of 10 weight percent NaOH in water was refluxed for 6 hours to saponify the carbauba wax. The hot reaction mixture was then acidified with aqueous sulfuric acid and thereafter washed twice with boiling water. The organic layer was stripped to 150° C. at 1 mm. Hg. A smooth, hard wax melting at 75° to 76° C. was recovered. The wax had an acid number of 56, thus 100 g. of hydrolyzed carnauba wax contained 0.1 equivalent of carboxylic acid groups and 0.2 equivalent or hydroxy grous.

A mixture of 10 g. of the above hydrolyzed carnauba wax, 10 g. of ethyleneglycoldimethylether and 5 drops of BF$_3$·CH$_3$CH$_2$OCH$_2$CH$_3$ was heated to 100° C. and then 6 g. of

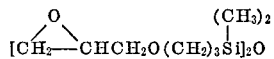

was added. The mixture was then stripped to 120° C. at 1 mm. Hg. The product was a smooth wax which had 0.01 equivalent of carboxylic acid group, 0.001 equivalent of epoxy groups remtaining and melted at about 80° C.

EXAMPLE 10

A mixture of 40 g. of the hydrolyzed carnauba wax of Example 9, 50 ml. of toluene, 25 g. of

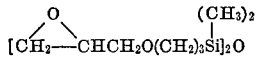

and 0.1 g. of KOH was refluxed for 4 hours. The solvent was removed and the residue was a hard, tough wax melting at 79° to 84° C. No indication of acid was found and 0.012 equivalent of epoxy groups remained.

EXAMPLE 11

When each of the following epoxy silicon-containing compounds in an amount providing 0.1 equivalent of epoxy group are substituted for

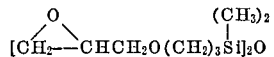

in Example 1 and the procedure of Example 1 is followed, a silicone-carnauba wax copolymer is produced:

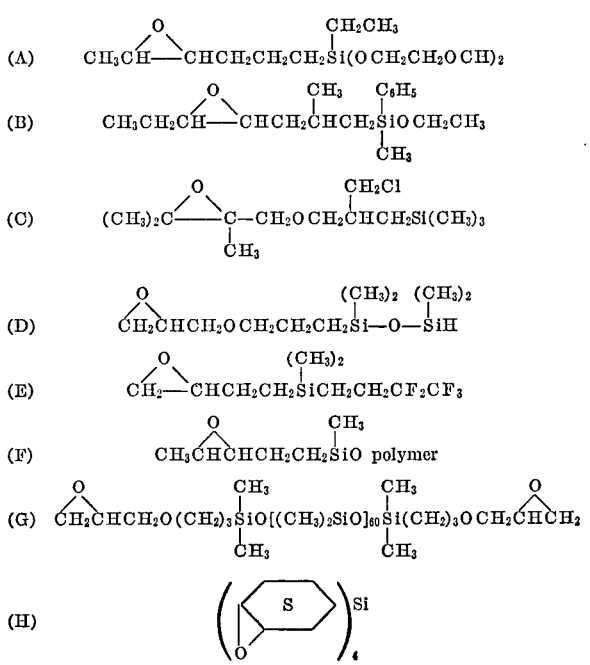

(I) An essentially (CH$_3$)$_3$SiO$_{0.5}$ endblocked polymer of the repeating units,

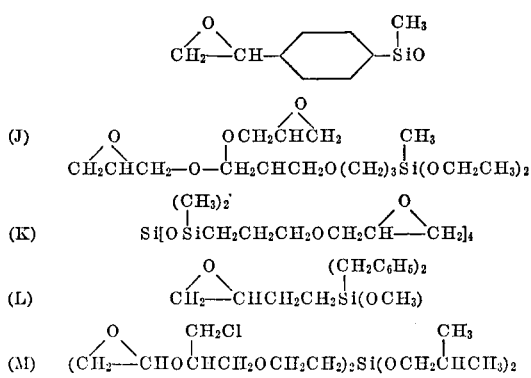

(N) A copolymer of 30 mol percent (C$_6$H$_5$)(CH$_3$)SiO units, 20 mol percent

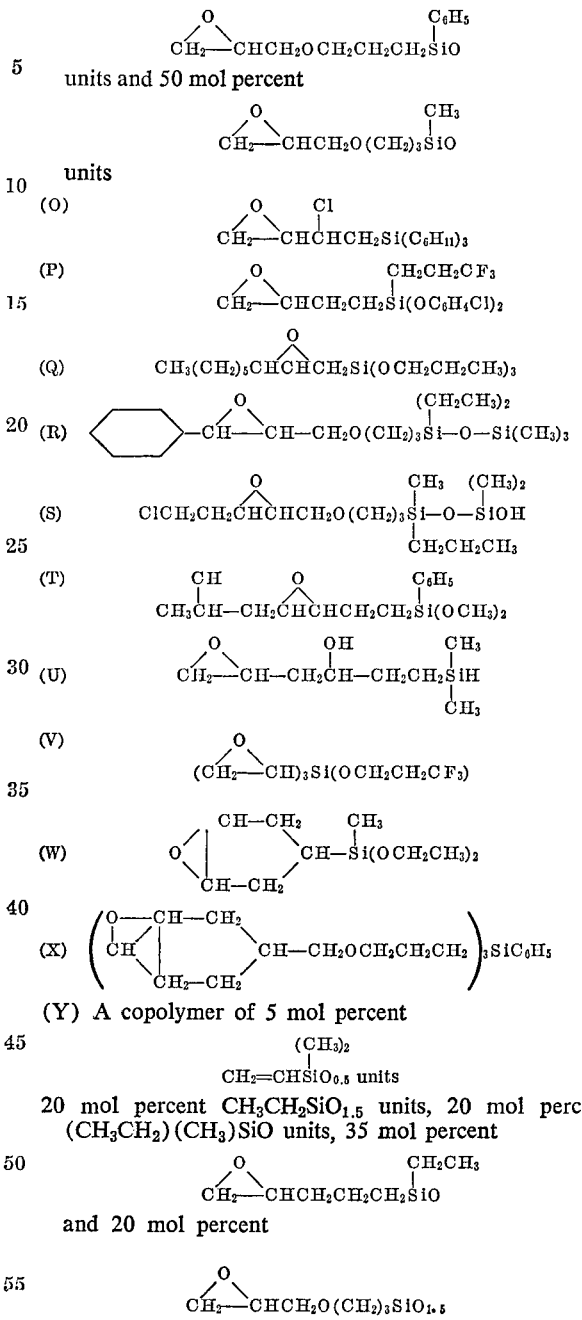

(Y) A copolymer of 5 mol percent (CH$_3$)$_2$
CH$_2$=CHSiO$_{0.5}$ units 20 mol percent CH$_3$CH$_2$SiO$_{1.5}$ units, 20 mol percent (CH$_3$CH$_2$)(CH$_3$)SiO units, 35 mol percent

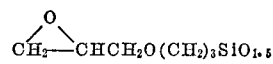

and 20 mol percent

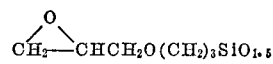

That which is claimed is:

1. A silicone-carnauba wax copolymer consisting essentially of a silicon-containing moiety bonded to carnauba wax moiety through an organic radical attached to a silicon atom through a silicon-carbon bond and said organic radical linking the silicon-containing moiety and the carnauba wax moiety by at least 60% ether linkages, said carnauba wax moiety being bonded to the silicon-containing moiety through an oxygen atom which in the unreacted state is contained by a hydroxyl radical of the carnauba wax, said silicon-containing moiety consisting essentially of at least one silicon atom to which is bonded through a silicon-carbon bond at least one divalent organic radical consisting essentially of carbon atoms, hydrogen atoms and oxygen atoms, and said silicon-containing moiety being present in an amount of from 5 to 70 weight percent based on the combined weight of the silicon-containing moiety and the carnauba wax moiety.

2. A silicon-carnauba wax copolymer consisting essentially of a silicon-containing moiety consisting essentially of at least one silicon atom to which is bonded through a silicon-carbon bond at least one divalent organic radical consisting essentially of carbon atoms, hydrogen atoms and oxygen atoms and at least 60% of said organic radical being bonded to a carnauba wax moiety through an ether linkage and any remaining valences of the silicon atom being satisfied by radicals selected from the group consisting of monovalent hydrocarbon radicals, monovalent halogenated hydrocarbon radicals, monovalent hydrocarbonoxy radicals, monovalent halogenated hydrocarbonoxy radicals, hydroxyl radicals, hydrogen atoms and divalent oxygen atoms bonded to another silicon atom forming a silicon-oxygen-silicon bond, said other silicon atom having its valences satisfied by radicals described above, said carnauba wax moiety being bonded to the silicon-containing moiety through an oxygen atom which in the unreacted state is contained by a hydroxyl radical of the carnauba wax, and said silicon-containing moiety being present in an amount of from 5 to 70 weight percent based on the combined weight of the silicon-containing moiety and the carnauba wax moiety.

3. A silicone-carnauba wax copolymer consisting essentially of a silicon-containing moiety bonded to a carnauba wax moiety at least 60% being through a (silicone)—$CY_k$—O—$CH_2$—(carnauba wax) linkage in which (silicone)—$CY_k$— is a silicon-containing moiety selected from the group consisting of

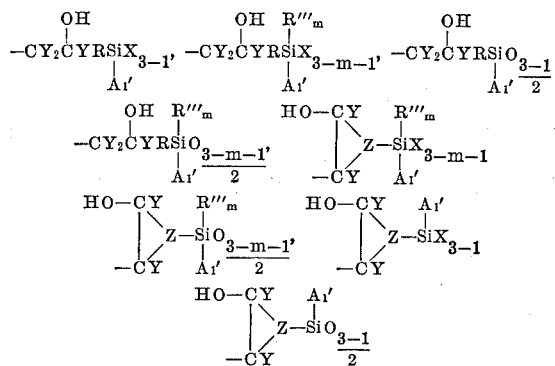

mixtures thereof, copolymers thereof, and copolymers consisting essentially of from 0.001 to 99.999 mol percent units of the formula selected from the group consisting of

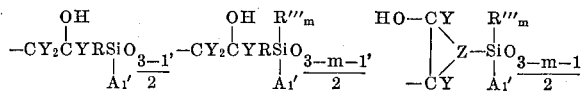

and

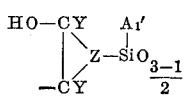

and 0.001 to 99.999 mol percent units of the formula selected from the group consisting of $SiO_{4/2}$, $R'''SiO_{1.5}$, $R'''_2SiO$ and $R'''_3SiO_{0.5}$, in which $k$ is an integer from 1 to 2 inclusive, Y is a monovalent radical selected from the group consisting of hydrocarbon radicals, halogenated hydrocarbon radicals, hydroxylated hydrocarbon radicals and hydrogen atoms, R is a divalent radical selected from the group consisting of hydrocarbon radicals, hydroxylated hydrocarbon radicals, halogenated hydrocarbon radicals and —$(R'OR')_x$— radicals in which R' is the same as R and $x$ is an integer of at least 1, X is a monovalent radical selected from the group consisting of hydroxyl radicals, hydrocarbonoxy radicals and halogenated hydrocarbonoxy radicals, R''' is a monovalent radical selected from the group consisting of hydrogen atoms, hydrocarbon radicals and halogenated hydrocarbon radicals, Z is a trivalent radical selected from the group consisting of hydrocarbon radicals, hydroxylated hydrocarbon radicals, halogenated hydrocarbon radicals and ZOR' radicals in which R' and $x$ are defined above, A' is a divalent radical selected from the group consisting of radicals and 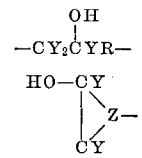

radicals which is bonded to the carnauba wax moiety through an oxygen atom in turn attached to the carbon atom which is attached to a Y radical, $l$ is an integer from 0 to 3, $m$ is an integer from 0 to 3, said carnauba wax moiety being bonded to the silicon-containing moiety through an oxygen atom which in the unreacted state is contained by a hydroxyl radical of the carnauba wax, and said silicon-containing moiety being present in an amount of from 5 to 70 weight percent based on the combined weight of the silicon-containing moiety and the carnauba wax moiety.

4. A silicone-carnauba wax copolymer consisting essentially of a silicon-containing moiety of the formula

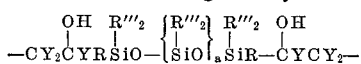

in which
Y is a monovalent radical selected from the group consisting of hydrocarbon radicals, halogenated hydrocarbon radicals, hydroxylated hydrocarbon radicals and hydrogen atoms,
R is a divalent radical selected from the group consisting of hydrocarbon radicals, hydroxylated hydrocarbon radicals, halogenated hydrocarbon radicals and —$(R'OR')_x$— radicals in which R' is the same as R and $x$ is an integer of at least 1,
R''' is a monovalent radical selected from the group consisting of hydrogen atoms, hydrocarbon radicals and halogenated hydrocarbon radicals and
$a$ has an average value from 0 to 100 inclusive, bonded to a carnauba wax moiety by at least 60% ether linkages, said carnauba wax moiety being bonded to the silicon-containing moiety thorugh an oxygen atom which in the unreacted state is contained by a hydroxyl radical of the carnauba wax, and said silicon-containing moiety being present in an amount of from 5 to 70 weight percent based on the combined weight of the silicon-containing moiety and the carnauba wax moiety.

5. A silicone-carnauba wax copolymer consisting essentially of a silicon-containing moiety of the formula

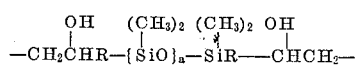

in which
R is a divalent radical selected from the group consisting of hydrocarbon radicals, hydroxylated hydrocarbon radicals, halogenated hydrocarbon radicals and —$(R'OR')_x$— radicals in which R' is the same as R and
$a$ has an average value from 0 to 50, bonded to a carnauba wax moiety by at least 60% ether linkages, said carnauba wax moiety being bonded to the silicon-containing moiety through an oxygen atom which in the unreacted state is contained by a hydroxyl radical of the carnauba wax, and said silicon-containing moiety being present in an amount of from 5 to 70 weight percent based on the combined weight of the silicon-containing moiety and the carnauba wax moiety.

6. A silicone-carnauba wax copolymer consisting essentially of a silicon-containing moiety of the formula

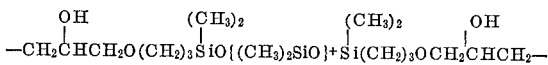

in which $a$ has an average value from 0 to 30, bonded to a carnauba wax moiety by at least 60% ether linkages, said carnauba wax moiety being bonded to the silicon-containing moiety through an oxygen atom which in the unreacted state is contained by a hydroxyl radical of the carnauba wax, and said silicon-containing moiety being present in an amount of from 5 to 70 weight percent based on the combined weight of the silicon-containing moiety and the carnauba wax moiety.

7. The silicone-carnauba wax copolymer in accordance with claim 6 in which $a$ is 0.

8. A silicone-carnauba wax copolymer consisting essentially of a silicon-containing moiety of the formula $$-CY_2\overset{\overset{OH}{|}}{C}YRSiX_3-l$$
$$\overset{|}{A'_l}$$

in which
Y is a monovalent radical selected from the group consisting of hydrocarbon radicals, halogenated hydrocarbon radicals, hydroxylated hydrocarbon radicals and hydrogen atoms,
R is a divalent radical selected from the group consisting of hydrocarbon radicals, hydroxylated hydrocarbon radicals, halogenated hydrocarbon radicals and $-(R'OR')_x-$ radicals in which R' is the same as R and $x$ is an integer of at least 1,
X is a monovalent radical selected from the group consisting of hydroxyl radicals, hydrocarbonoxy radicals and halogenated hydrocarbonoxy radicals,
A' is a divalent radical of the formula $$-CY_2\overset{\overset{OH}{|}}{C}YR-$$

which is bonded to the carnauba wax moiety through an oxygen atom in turn attached to the carbon atom which is attached to a Y radical, and
$l$ is an integer from 0 to 3 inclusive, bonded to a carnauba wax moiety by at least 60% ether linkages, said carnauba wax moiety being bonded to the silicon-containing moiety through an oxygen atom which in the unreacted state is contained by a hydroxyl radical of the carnauba wax, and said silicon-containing moiety being present in an amount of from 5 to 70 weight percent based on the combined weight of the silicon-containing moiety and the carnauba wax moiety.

9. The silicone-carnauba wax copolymer in accordance with claim 8 in which
Y is a hydrogen atom,
R is a $-(R'OR')_x-$ radical and
$l$ is 0.

10. The silicone-carnauba wax copolymer in accordance with claim 9 in which
X is an alkoxy radical.

11. The silicone-carnauba wax copolymer in accordance with claim 10 in which
X is a methoxy radical and
R is a $-CH_2OCH_2CH_2CH_2-$ radical.

12. A silicone-carnauba wax copolymer consisting essentially of a silicon-containing moiety of the unit formula $$-CY_2\overset{\overset{OH}{|}}{C}YR\overset{\overset{R'''_m}{|}}{Si}O_{\frac{3-m-l}{2}}$$
$$\overset{|}{A'_l}$$

in which
Y is a monovalent radical selected from the group consisting of hydrocarbon radicals, halogenated hydrocarbon radicals, hydroxylated hydrocarbon radicals, and hydrogen atoms,
R is a divalent radical selected from the group consisting of hydrocarbon radicals, hydroxylated hydrocarbon radicals, halogenated hydrocarbon radicals and $-(R'OR')_x-$ radicals in which R' is the same as R and $x$ is an integer of at least 1, R''' is a monovalent radical selected from the group consisting of hydrogen atoms, hydrocarbon radicals and halogenated hydrocarbon radicals,
A' is a divalent radical of the formula $$-CY_2\overset{\overset{OH}{|}}{C}YR-$$

which is bonded to the carnauba wax moiety through an oxygen atom in turn attached to the carbon atom which is attached to a Y radical,
$l$ is an integer from 0 to 2,
$m$ is an integer from 0 to 2, bonded to a carnauba wax moiety by at least 60% ether linkages, said carnauba wax moiety being bonded to the silicon-containing moiety through an oxygen atom which in the unreacted state is contained by a hydroxyl radical of the carnauba wax, and said silicon-containing moiety being present in an amount of from 5 to 70 weight percent based on the combined weight of the silicon-containing moiety and the carnauba wax moiety.

13. A silicone-carnauba wax copolymer in accordance with claim 12 in which
Y is a hydrogen atom,
R''' is a methyl radical,
$m$ is 1 and
$l$ is 0.

14. A silicone-carnauba wax copolymer in accordance with claim 13 in which the silicon-containing moiety is a cyclic polysiloxane.

15. A silicone-carnauba wax copolymer consisting essentially of a silicon-containing moiety of the formula $$\{-CH_2\overset{\overset{OH}{|}}{C}HCH_2O(CH_2)_3\overset{\overset{CH_3}{|}}{Si}O\}_5$$

bonded to a carnauba wax moiety at least 60% being through ether linkages, said carnauba wax moiety being bonded to the silicon-containing moiety through an oxygen atom which in the unreacted state is contained by a hydroxyl radical of the carnauba wax, and said silicon-containing moiety being present in an amount of from 5 to 70 weight percent based on the combined weight of the silicon-containing moiety and the carnauba wax moiety.

16. A silicone-carnauba wax copolymer consisting essentially of silicon-containing moiety of the formula $$(CH_3)_3SiO\overset{\overset{(CH_3)_2}{|}}{Si}CH_2CH_2-\!\!\left\langle\;S\;\right\rangle\!\!-\overset{OH}{\phantom{|}}$$

bonded to a carnauba wax moiety by at least 60% ether linkages, said carnauba wax moiety being bonded to the silicon-containing moiety through an oxygen atom which in the unreacted state is contained by a hydroxyl radical of the carnauba wax, and said silicon-containing moiety being present in an amount of from 5 to 70 weight percent based on the combined weight of the silicon-containing moiety and the carnauba wax moiety.

17. A silicone-carnauba wax copolymer consisting essentially of a silicon-containing moiety of a copolymer consisting of from 0.001 to 99.999 mol percent of units of the formula selected from the group consisting of $$-CY_2\overset{\overset{OH}{|}}{C}YR\overset{\overset{A'_l}{|}}{Si}O_{\frac{3-l}{2}},\; -CY_2\overset{\overset{OH}{|}}{C}YR\overset{\overset{R'''}{|}}{Si}O_{\frac{3-l-m}{2}},\; \overset{HO-CY}{\underset{-CY}{\left|\begin{array}{c}\diagdown\\ \diagup\end{array}\right.}}Z-\overset{\overset{R'''_m}{|}}{Si}O_{\frac{3-m-l}{2}}$$

and $$\overset{HO-CY}{\underset{-CY}{\left|\begin{array}{c}\diagdown\\ \diagup\end{array}\right.}}Z-\overset{\overset{A'_l}{|}}{Si}O_{\frac{3-l}{2}}$$

and from 0.001 to 99.999 mol percent units of the formula selected from the group consisting of $SiO_{4/2}$, $R'''SiO_{1.5}$, $R'''_2SiO$ and $R'''_3SiO_{0.5}$, in which
Y is a monovalent radical selected from the group consisting of hydrocarbon radicals, halogenated hydrocarbon radicals, hydroxylated hydrocarbon radicals and hydrogen atoms, R is a divalent radical selected from the group consisting of hydrocarbon radicals, hydroxylated hydrocarbon radicals, halogenated hydrocarbon radicals and —(R'OR')$_x$— radicals in which R' is the same as R and $x$ is an integer of at least 1, R''' is a monovalent radical selected from the group consisting of hydrogen atoms, hydrocarbon radicals and halogenated hydrocarbon radicals, Z is a trivalent radical selected from the group consisting of hydrocarbon radicals, hydroxylated hydrocarbon radicals, halogenated hydrocarbon radicals and —(R'OR')$_x$— radicals in which R' and $x$ are defined above, A' is a divalent radical selected from the group consisting of

radicals and

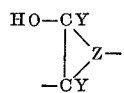

radicals which is bonded to the carnauba wax moiety through an oxygen atom in turn attached to the carbon atom which is attached to a Y radical $l$ is an integer from 0 to 2 and $m$ is an integer from 0 to 2, bonded to a carnauba wax moiety by at least 60% ether linkages, said carnauba wax moiety being bonded to the silicon-containing moiety through an oxygen atom which in the unreacted state is contained by a hydroxyl radical of the carnauba wax, and said silicon-containing moiety being present in an amount of from 5 to 70 weight percent based on the combined weight of the silicon-containing moiety and the carnauba wax moiety.

18. The silicone-carnauba wax copolymer in accordance with claim 17 in which Y is a hydrogen atom, R is —(R'OR')$_x$— and R''' is a methyl radical.

19. The silicone-carnauba wax copolymer in accordance with claim 18 in which the copolymer of the silicon-containing moiety consists of from 0.1 to 99.9 mol percent units of the formula

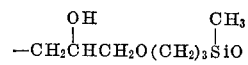

and 0.1 to 99.9 mol percent of the units of the formula $(CH_3)_2SiO$.

References Cited

UNITED STATES PATENTS 3,166,527   1/1965   Ender _____ 260—33.2

OTHER REFERENCES

Fettes, E. M. "Chemical Reactions of Polymers," Interscience Publishers, N.Y., 1964, pages 920–923.

Warth, "The Chemistry and Technology of Waxes," Reinhold Publ., N.Y., 1956, pages 165–173.

Bennett, "Commercial Waxes," Chemical Publ., N.Y., 1956, pages 115–116.

ALLAN LIEBERMAN, Primary Examiner

U.S. Cl. X.R.

106—270, 271; 260—348, 398, 448.2